United States Patent
Whitehouse

[15] 3,666,021
[45] May 30, 1972

[54] POWER TOOL HAVING PROPORTIONING TRANSMISSION

[72] Inventor: Hugh L. Whitehouse, Lyndhurst, Ohio
[73] Assignee: The Stanley Works, New Britain, Conn.
[22] Filed: May 13, 1970
[21] Appl. No.: 36,951

[52] U.S. Cl..............................173/12, 64/27 CT, 73/139, 81/52.4, 173/163, 192/150
[51] Int. Cl........................................B25b 23/14
[58] Field of Search..................173/12, 163; 64/27 CT; 81/52.4; 73/139; 192/150

[56] References Cited
UNITED STATES PATENTS

| 3,195,704 | 7/1965 | Linsker | 173/12 X |
| 1,662,223 | 3/1928 | Werner et al. | 64/27 CT |
| 1,987,316 | 1/1935 | Zimmer | 64/27 CT |
| 2,035,554 | 3/1936 | Krejmas | 64/27 CT |

Primary Examiner—Ernest R. Purser
Attorney—Prutzman, Hayes, Kalb & Chilton

[57] ABSTRACT

Fastener setting power tool having a proportioning transmission capable of repeatedly applying fastener setting torque within rigorous torque tolerance limits irrespective of the rate of fastener deceleration.

24 Claims, 6 Drawing Figures

Patented May 30, 1972
3,666,021
2 Sheets-Sheet 1
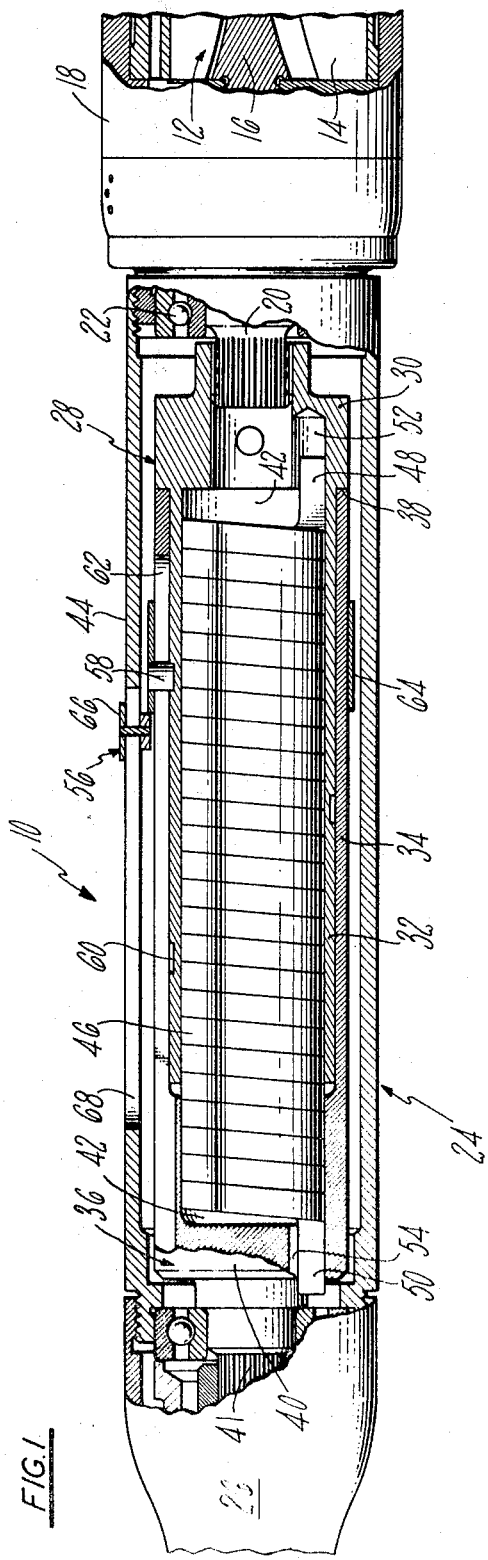
FIG.1.
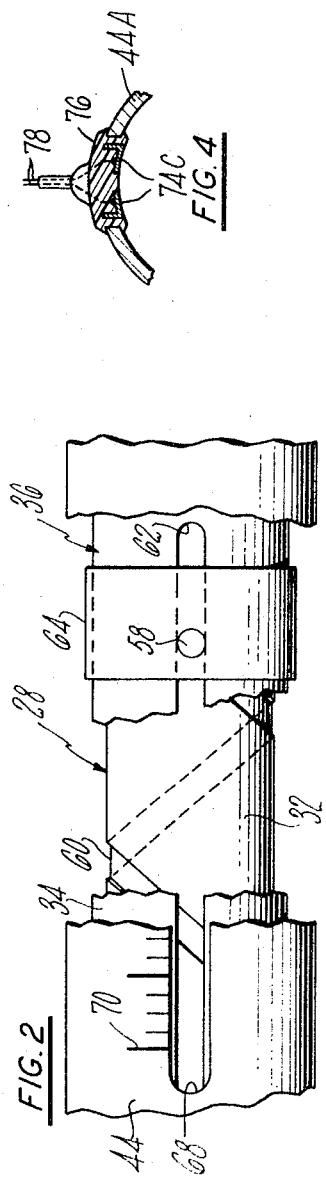
FIG.2
FIG.4
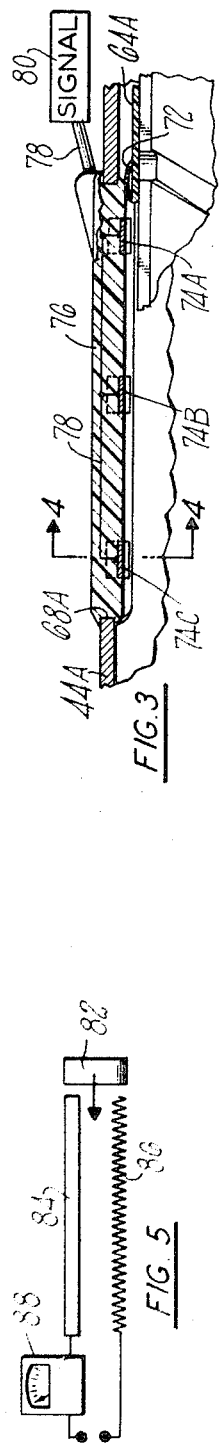
FIG.3
FIG.5
INVENTOR
HUGH L. WHITEHOUSE
BY Prutzman, Hayes, Kalb and Chilton
ATTORNEYS 3,666,021

POWER TOOL HAVING PROPORTIONING TRANSMISSION

FIELD OF THE INVENTION

This invention generally relates to the power fastening art and particularly concerns a precision torque limiting device for an air tool.

BACKGROUND OF THE INVENTION

The tightening of threaded fasteners frequently requires that a torque load applied to a fastener be within a permissible tolerance range. Applied torque loading close to desired fastener torque may be achieved by conventional power tools without substantial difficulty when the fastener resistance steadily increases to gradually slow down the tool as the fastener is being tightened. Such jobs are referred to as so-called "soft" jobs.

Difficulties, however, are presented by "hard" jobs in attaining close torque tolerance requirements wherein fastener loading builds up so quickly as to result in almost instantaneous arrest of the fastener. As the output end of a conventional tool is brought to a hard slam stop from a high-speed free-running condition, an inertial impact of high magnitude is all too frequently transmitted from the driving parts of the tool to the fastener, resulting in a finally tightened fastener having a torque loading well beyond a maximum torque tolerance limit.

The continuously expanding use of assembled components has resulted in an ever increasing number of applications requiring the utmost care in setting a wide variety of fasteners to stringent torque tolerance limits. No single assembly tool is known which will precisely control the peak applied torque within close tolerance requirements for a wide variety of jobs including not only "soft" but also extremely "hard" jobs wherein, e.g., 30° fastener rotation may be specified between free running and desired full fastener torque.

Increased demand for precisely torqued jobs has also resulted in additional need for reliable verification of the peak applied torque loading of a fastener and, frequently, for a continuous reading of the instantaneous torque delivered to a job under running load conditions.

BRIEF SUMMARY OF THE INVENTION

The present invention relates generally to rotary power tools for setting fasteners and more particularly to a rotary power tool having a new and improved torsional drive for applying the fastener setting torque.

A primary object of this invention is to provide an improved power tool capable of applying precisely controlled torque to a fastener irrespective of the deceleration rate of the fastener being tightened.

Another object of this invention is to provide an improved proportioning transmission usable with a power tool having speed characteristics in inverse relation to its load characteristics and which minimizes inertial torque transfer to a fastener to closely match the fastener torque applied to a predetermined torque desired, regardless of whether the fastener setting operation is a typical "soft" or "hard" type job.

Still another object of this invention is the provision of an improved proportioning transmission of the type described having a compact rugged construction which is quick and easy to manufacture and assemble.

A further object of this invention is to provide an improved power tool capable of accurately and continuously indicating the torque being applied during a fastener setting operation as well as for measuring the peak applied fastener torque. Included in this object is the aim of providing a tool having a suitable torque indicator which is readily calibrated and quick and easy to use for verifying the torque load being applied to a fastener.

Other objects will be in part obvious and in part pointed out in more detail hereinafter.

A better understanding of the objects, advantages, features, properties and relationships of the invention will be obtained from the following detailed description and accompanying drawings which set forth certain illustrative embodiments and are indicative of the various ways in which the principle of the invention is employed.

BRIEF DESCRIPTION OF THE DRAWINGS

In the drawings:

FIG. 1 is a side view, partly in section and partly broken away, showing a part of a power tool incorporating this invention;

FIG. 2 is a side view of the tool of FIG. 1, partly broken away, showing a portion of one embodiment of a torque indicator provided in accordance with this invention;

FIG. 3 is a longitudinal side view, partly in section and partly broken away, showing a second embodiment of a torque indicator provided in accordance with this invention;

FIG. 4 is a cross-sectional view, partly broken away, taken generally along line 4—4 of FIG. 3;

FIG. 5 is a schematic diagram of still another embodiment of a torque indicator device provided in accordance with this invention.

DESCRIPTION OF PREFERRED EMBODIMENTS

Figure 6:
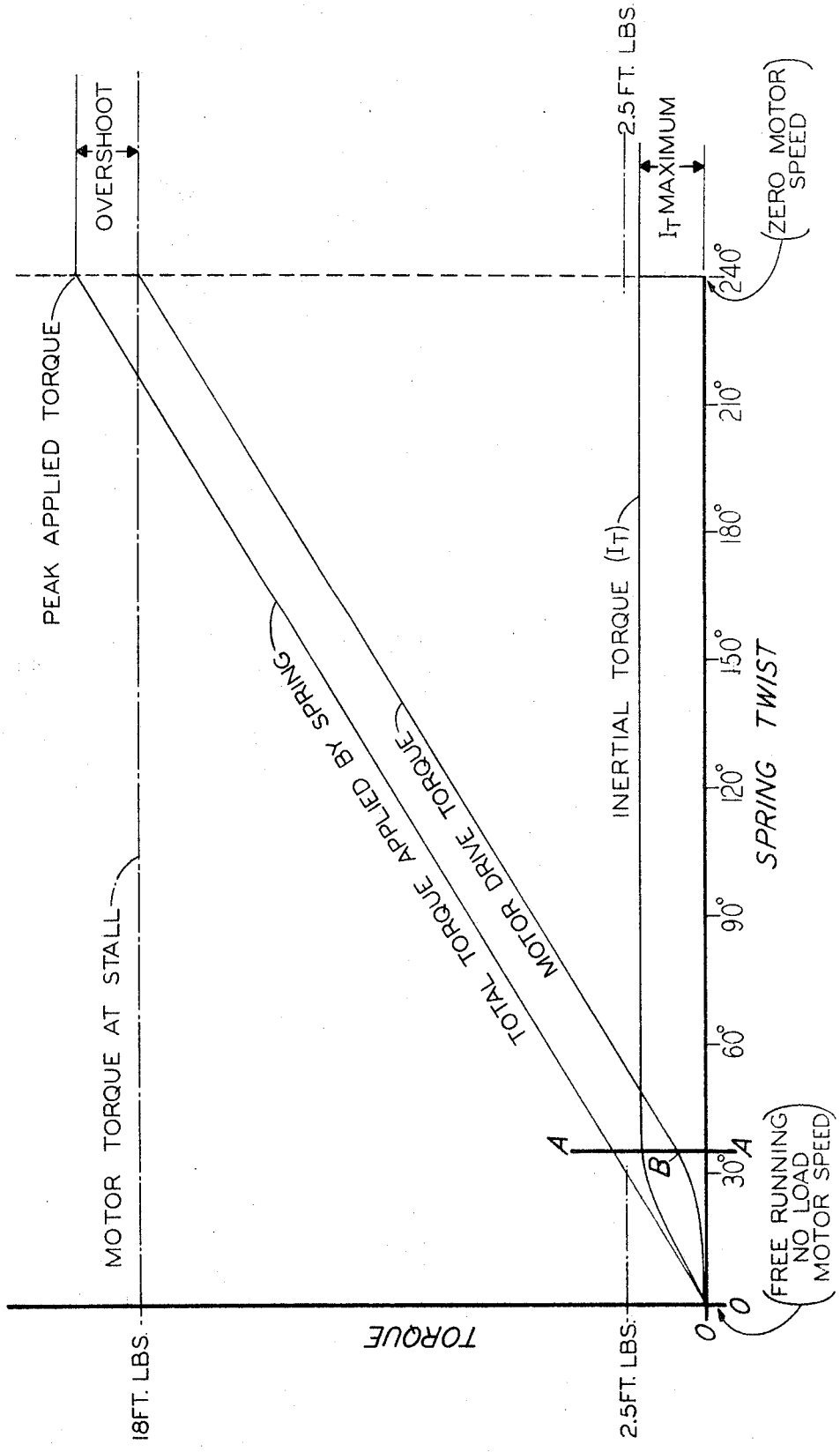
FIG. 6 is a graphical representation of torque transmitted to a fastener by the power tool of this invention during a fastener setting operation.

Referring in detail to the drawings and particularly to that embodiment of the invention illustrated in FIGS. 1 and 2, a power tool 10 is shown having a motor such as the illustrated air motor 12 which will be understood to be connected to a suitable source of air pressure, not shown, for rotating vanes 14 of a rotor 16. The rotor 16 is drivingly connected through conventional gearing, not shown, within a gear housing 18 to a spindle 20 supported for rotation by suitable bearings such as at 22.

To apply a precisely controlled peak applied fastener torque which is closely matched to a desired predetermined torque load for a wide variety of not only "soft" but also "hard" jobs within stringent tolerance limits, the power tool 10 of this invention incorporates a proportioning transmission 24 coupled between the spindle 20 and an output drive 26 for minimizing any increase in torque beyond a desired full fastener load.

More specifically, the proportioning transmission 24 includes a tubular driving member 28 with an enlarged input end 30 having a splined connection to the spindle 20. The driving member 28 is shown having an extension 32 received in coaxial telescoped relation within a complementary extension 34 of a tubular driven member 36 which terminates in abutting relation to a shoulder 38 on the driving member 28. The driven member 36 has an enlarged output end 40 with a spindle 41 shown as being splined to effect a suitable driving connection to the output drive 26. The output drive 26 will be understood to be adapted for use with any one of a variety of conventional toolholders, not shown, for tightening different types of fasteners, typically threaded fasteners, onto a workpiece.

In the specific illustrated embodiment, the driving member extension 32 projects into the driven member extension 34 a distance preferably more than half its full length and the members 28, 36 are suitably dimensioned to provide mutual rotary bearing support while additionally acting to maintain one another in coaxial alignment. A portion of the driven member 36 is shown having a reduced internal diameter adjacent its output end 40, this internal diameter preferably being dimensioned equal to that of the driving member 28 to form a chamber 42 of a generally continuous, uniform diameter extending between the input and output ends 30, 40 of the driving and driven members 28 and 36. The maximum outer diameters of members 28 and 36 are shown to be generally equal to one another but less than the internal diameter of a proportioning transmission housing 44 which circumferentially extends in spaced relation about the members 28, 36.

In accordance with this invention, the proportioning transmission 24 features a kinetic energy absorption device which in the specified illustrated embodiment is shown as a helical torsion spring 46 coaxially received within the chamber 42. The spring 46 is formed with straight offset arms 48, 50 at its opposite ends respectively captured in elongated openings 52, 54 extending longitudinally of the enlarged ends of the driving and driven members 28, 36. The spring 46 is wound such that angular deflection responsive to rotation of the spindle 20 relative to the output drive 26 contracts the coils of the spring 46 and axially lengthens the spring 46 to a proportionate extent. To provide efficient rotary power transmission while at the same time ensuring a substantial energy absorption capacity, the spring 46 is shown having its coils closely wound and positioned between the ends of the tubular members 28, 36 with freedom of movement for unrestricted axial deflection and radial contraction upon being twisted under application of a load.

Upon energizing the air motor 12, its rotor 16 accelerates to a free-running no-load speed, and the drive between the tubular members 28, 36 is almost immediately synchronized with the spring 46 remaining in a relatively relaxed state as shown in FIG. 1. As the fastener resistance builds up, the drive torque output of the tool 10 increases from zero inversely to the loading of the motor by the spring 46. In a "soft" job, the tool 10 slows down gradually as fastener resistance to tightening builds up slowly, and little inertial torque is transmitted to the fastener due to the relatively low, gradual rate of fastener deceleration. Accordingly, peak applied torque normally will be closely matched to static motor torque at the time of shutoff or stall. However, precisely controlled application of torque becomes increasingly difficult as fastener resistance builds up more quickly to suddenly increase the rate of deceleration of the output drive 26 of the tool 10. Under such conditions, the inertial torque of the rotating mass, which is proportional to its angular deceleration, could possibly impose an excessive torque impact loading on the fastener, driving it beyond an acceptable maximum torque tolerance limit.

By the provision of the proportioning transmission 24 of this invention wherein its energy absorption spring 46 is loaded from a relatively relaxed condition at free-running no-load speed of the motor 12, inertial torque loading of the spring 46 commences simultaneously with the drive torque loading upon starting of running load conditions whereby the inertial torque transmitted to a fastener has been found to be significantly reduced while the kinetic energy of the decelerating tool parts is absorbed and/or dissipated by the spring 46 even under extremely stringent "hard" job applications.

For example, the worst condition would occur if a fastener were instantaneously arrested from a free-running no-load speed. In this regard, reference is made to the graph in FIG. 6 wherein the torque applied to a fastener is plotted against spring twist under a condition wherein a fastener is instantaneously arrested. The graph is based, e.g., upon a motor, the speed characteristics of which are an inverse function of its load characteristics, and the use of a proportioning transmission spring 46 of a given constant linear rate sufficient to decelerate the motor 12 and its associated drive parts from a free-running no-load speed under such running load conditions. The applied spring torque shown in the graph is a function of its spring rate, the drive torque/speed characteristics of the drive parts and their moment of inertia, it being understood that the relatively low mass of the spring and its moment of inertia together with that of the driven parts is disregarded for purposes of this explanation.

Assuming the output drive 26 instantaneously slams to a stop, the total torque applied by the spring 46 will be equal to the sum of the motor drive torque and the inertial torque of the decelerating drive parts. With the fastener being decelerated at its maximum possible rate, the motor drive torque initially increases nonlinearly from zero to the point where the rate of increase in the motor drive torque equals the rate of increase in the spring torque, during which initial period the rate of increase in inertial torque diminishes. Once the rate of increase in the motor drive torque equals the spring rate, i.e., the point B on the line A—A in FIG. 6, the rotating drive parts will thereafter decelerate at a constant rate whereby the inertial torque will remain constant and the drive torque will increase linearly. This condition of dynamic equilibrium continues until the motor 12 is either shut off or stalled, whichever occurs first, depending on the type of power tool with which the proportioning transmission 24 of this invention is being used.

As the motor 12 is decelerating under such running load conditions, its kinetic energy is being absorbed by the proportioning transmission spring 46 and only static forces will be transmitted to the fastener, thereby limiting the peak applied fastener torque to the sum of the maximum inertial torque and the maximum motor drive torque.

By virtue of the above-described proportioning transmission 24, any so-called "overshoot" beyond a desired full fastener torque loading will be closely limited to approximately the maximum inertial torque transmitted to the fastener during a setting operation and, as the spring is progressively loaded throughout fastener running, the inertial torque is minimized. Since the spring 46 is in an unloaded condition at free-running no-load motor speed, the unstressed spring 46 twists coincident with initial application of load whereby the maximum inertial torque applied to the fastener may be limited, even under "hard" job applications, to an absolute magnitude within accepted tolerance requirements.

As an example, the air motor 12 may be assumed to be equipped with a proportioning transmission 24 of the type disclosed with a typical spring rate of about 30 foot pounds per 360° twist of the spring 46. If the motor 12 were set to stall or shut off at a desired full fastener load of, say, 18 foot pounds torque, and assuming a 12:1 gear reduction from the rotor 16 to the spindle 20, the spring 46 upon arrest of its output end would be capable of decelerating the motor 12 from free-running to stall or shut off in about eight motor revolutions. During deceleration the spring 46 would absorb the kinetic energy of the rotating mass at a rate of about 2.5 foot pounds per 30° spring twist (one motor revolution). If the output drive 26 were arrested instantaneously (again, the worst condition for controlling the inertial effects of the decelerating driving parts), the drive torque of the motor 12 would initially increase nonlinearly from zero until its rate of increase equals that of the applied spring torque. The inertial torque then becomes constant, and referring to FIG. 6 which graphically represents this example, such a condition would appear to occur between 35° and 40° spring twist, or shortly after one motor revolution. The maximum inertial torque applied to the fastener as indicated in FIG. 6 is less than 2.5 foot pounds torque applied by the spring 46 in one motor revolution. As the "overshoot" approximately equals the maximum inertial torque transmitted to the fastener, an "overshoot" of, say, even 2 foot pounds beyond the desired 18 foot pounds full fastener load amounts to only about 11 percent. In practice wherein at least some fastener advance, say, 30° or 40°, is permitted between free-running no-load speed of the output drive 26 to desired full fastener load, it will be seen that the "overshoot" will likely be reduced to an even smaller percentage of desired full fastener load and still be well within acceptable tolerance requirements even for such "hard" job applications.

Should the motor 12 rebound upon stopping, any tendency of loosening the tightened fastener is minimized by an automatic energy dissipating action of the spring 46 which, upon being unwound, prevents reverse torquing to an extent of the stored kinetic energy.

In accordance with another aspect of this invention, any need to audit each individual job to verify that the finally tightened condition of the fastener is within permissible torque indicating device which is responsive to the loading of the spring 46 and which may be readily adapted to provide accurate indication of the applied fastener torque by suitable measuring and/or signal means.

The embodiment shown in FIGS. 1 and 2 illustrates an indicating device 56 which is suited not only to measure peak applied fastener torque of each job but also to provide a continuous monitor during fastener rundown which reflects instantaneous applied fastener torque at any given time during a setting operation.

The spring loading as reflected by relative rotation of the driving and driven members 28, 36 is used for indicating applied fastener torque as the proportioning transmission spring 46 is being wound up. As the output drive 26 decelerates relative to the spindle 20, driving member 28 winds up the spring 46 and simultaneously causes post 58 to track within a helical guideway 60 of preselected pitch formed in driving member 28. The post 58 extends radially outwardly through an axially extending guide opening 62 in the driven member 36 and is secured to a sleeve 64 supported for longitudinal sliding movement on the driven member 36 in the clearance between the driven member and the housing 44. Sleeve 64 maintains the post 58 in camming engagement with member 28 within its guideway 60, while the rotating driving member 28 cams the post 58 toward the output end of the tool 10 and longitudinally displaces the sleeve 64 along the outer surface of the driven member 36 a linear distance proportional to the extent of the spring twist imposed during fastener setting.

The above-described torque sensing means is used to longitudinally displace a suitable manually resettable pointer 66 for indicating applied fastener torque. As illustrated, the pointer 66 is received for movement in a longitudinally extending slot 68 in the transmission housing 44 and is actuated by longitudinal displacement of the sleeve 64. The pointer 66 is preferably closely fitted to the housing 44 with a light frictional load such that upon moving from its illustrated zero torque position toward the output end of the tool 10, the pointer 66 will automatically remain in the extreme position to which it was moved during fastener setting for showing peak applied torque as indicated by indicia 70 on the housing 44. If desired, the indicia may be calibrated in foot pounds torque to conveniently provide a direct readout of the peak fastener torque applied. Once the spring 46 is permitted to unwind, the torque sensing sleeve 64 is automatically retracted to its illustrated zero torque position and the pointer 66 then may be manually reset to condition the torque indicator 56 for the next operation. If desired, markings may be provided on the housing 44 indicative of minimum and maximum torque tolerance limits to enable an operator to make a simple, accurate determination of whether a fastener has been set within preselected tolerance requirements.

Another torque indicator device is shown in FIGS. 3 and 4 having a sleeve 64A which is mechanically moved as in the previously described embodiment for sensing applied torque and actuating an indicator. Sleeve 64A is shown carrying a movable contact 72 which bridges any one of three pairs of stationary contacts 74A, 74B and 74C shown embedded in longitudinally spaced locations in a plastic insert 76 which is suited to be snap fitted into the slot 68A in the housing 44A. Each set of stationary contacts is shown connected by lead wires 78 to any suitable signaling device 80 and the contacts are located relative to the path of movement of the bridging contact 72 such that a first contact pair 74A indicates when the tool 10 has been put on a job; the second contact pair 74B will signal when a minimum torque tolerance limit has been reached; and the third contact pair 74C will indicate when a maximum torque tolerance limit has been exceeded.

The torque indicator schematically shown in FIG. 5 provides an arrangement suitable for use with the tool 10 to provide a direct readout of applied fastener torque. A bridging contact 82 similar to that shown in FIG. 3 is mounted, e.g., on a sleeve, not shown, for movement along a conductor rail 84 to complete a circuit connection to a variable resistor 86 disposed longitudinally of the tool whereby the extent of relative rotary movement between the tubular members 28, 36 is reflected in a reading, e.g., from a meter 88 suitably calibrated to indicate fastener torque delivered to a job.

As will be readily apparent, the devices shown in FIGS. 3–5 could be adapted to produce audible signals or be used in connection with a variety of devices located, if desired, remotely from the tool 10 to operate a permanent record card punch or other device suitable to meet the requirements of a particular job. The disclosed monitoring feature also may be employed for actuating a shutoff mechanism or disconnecting driven and driving clutch elements of a clutch type tool, not shown, at a predetermined applied torque. For example, motive power of the illustrated tool 10 may be controlled by suitable mechanical linkage, not shown, actuated by the sleeve 64A or by a signaling device located in the path of travel of sleeve 64A as shown in FIG. 4, wherein it will be understood that the contact pair 74C may be adjustably positioned along the axial path of the sleeve 64A to terminate power application of the tool 10 at a selected torque level.

A power tool constructed in accordance with this invention is not only of compact, rugged construction, particularly suited to apply precisely limited torque in a broad range of different fastener setting operations having rigorous torque requirements, but is also quick and easy to manufacture, assemble and calibrate. In addition, the disclosed power tool is capable of providing a continuous readout of the torque as it is being applied to a job as well as providing an accurate measurement of peak applied fastener torque.

As will be apparent to persons skilled in the art, various modifications, adaptations and variations of the foregoing specific disclosure can be made without departing from the teachings of the present invention.

I claim:

1. A power tool for setting fasteners to a specified torque comprising a motor having a rotary drive and adapted to be energized to rotate the rotary drive at a specified free-running no-load speed and with a drive torque which increases as the rotary drive speed decreases from said no-load speed, a rotary output for setting fasteners, and unloaded torsion spring means interconnecting the rotary drive and rotary output for driving the rotary output, the torsion spring means having resistance to torsional deflection which increases with deflection and being operable to be angularly deflected continually and unrestrictively from its unloaded condition to provide for smooth deceleration of the rotary drive by the rotary output from its free-running no-load speed with the motor remaining energized.

2. The power tool of claim 1 wherein the motor is a rotary fluid motor set to stall or shut off at said specified torque, and wherein the spring means has a spring rate sufficient to decelerate the fluid motor to stall or shut off in approximately eight motor revolutions upon instantaneous arrest of the rotary output from free-running no-load speed.

3. The power tool of claim 1 further including torque indicating means operable in response to loading of the spring means for indicating applied fastener torque.

4. The power tool of claim 1 wherein the spring means is a helical torsion coil spring having opposite ends drivingly connected to the rotary drive and the rotary output and its coils positioned therebetween with freedom of movement for unrestricted axial deflection and radial contraction responsive to loading.

5. The power tool of claim 1 wherein the spring means has a spring rate sufficient to decelerate the rotary drive when the rotary output is arrested without further angular movement from free-running no-load speed while limiting peak applied fastener torque during such deceleration to a magnitude less than 125 percent of said specified torque.

6. The power tool of claim 1 further including selectively operative signal means for indicating an acceptable torque range, and a torque sensing device controlling operation of the signal means responsive to relative rotation between the rotary drive and the rotary output.

7. The power tool of claim 1 wherein the torsion spring means is active under running load conditions and has a spring rate sufficient to decelerate the motor when the rotary output is instantaneously arrested from free-running no-load speed while limiting peak applied fastener torque during such deceleration to a magnitude less than 125 percent of said specified torque.

8. The power tool of claim 1 further including a torque indicator for indicating peak applied fastener torque, and a torque sensing device for actuating the torque indicator, the torque sensing device being movable responsive to relative relation between the rotary drive and the rotary output.

9. The power tool of claim 8 wherein the torque indicator is operable under running load conditions and provides a continuous monitor of applied fastener torque.

10. The power tool of claim 1 wherein the torsion spring means has a spring rate sufficient to decelerate the rotary drive throughout the full range of running load conditions, and wherein the torsion spring means is operable for applying a relatively constant peak applied fastener torque irrespective of the deceleration rate of the rotary output due to fastener resistance to torque loading.

11. The power tool of claim 10 wherein said peak applied fastener torque exceeds said specified torque to an extent approximately equal to the maximum inertial torque transmitted from the rotary drive to the rotary output, and wherein torsional deflection of the torsion spring means is coincident with initial fastener torque loading for minimizing the magnitude of the transmitted inertial torque.

12. The power tool of claim 10 wherein the torsion spring means limits said peak applied fastener torque to a magnitude less than 125 percent of said specified torque.

13. A power tool useable in setting fasteners to a predetermined full fastener load and comprising power operated rotary drive means, rotary output means for setting fasteners, and a transmission including torsion spring means coupling the drive means to the output means, the torsion spring means being active under running load conditions and continuously maintaining a resilient driving connection between the drive means and the output means under running load conditions irrespective of the magnitude of peak applied fastener torque, the transmission including a helical cam member connected to one of the drive means and output means, a linearly movable cam follower in camming engagement with the helical cam, member and a follower guide member supported on the other of the drive means and output means, the helical cam and follower guide members being relatively rotatable, and the cam follower being operative for sensing torque applied by the torsion spring means upon rotation of the drive means relative to the output means as indicated by linear movement of the cam follower.

14. The power tool of claim 13 further including display means operated by the cam follower for providing a visual indication of the torque applied by the spring means.

15. The power tool of claim 13 further including a transmission housing, the drive means and the output means being substantially aligned for rotation about a common axis, and fastener torque indicating means including a resettable marker supported for movement on the housing responsive to movement of the cam follower in one linear direction with respect to the axis of rotation during loading of the spring means.

16. The power tool of claim 13 wherein the helical cam and follower guide members are tubular members in coaxial telescoped relation.

17. The power tool of claim 16 wherein the spring means is a helical torsion spring received within the tubular helical cam and follower guide members and having opposite ends coupled to the drive means and output means with freedom of movement within the guide members for unrestricted radial contraction and axial extension responsive to loading.

18. The power tool of claim 13 further including control means for controlling application of motive power to the output means of the tool, and actuating means for actuating the control means for terminating the application of motive power to the output means.

19. The power tool of claim 18 wherein the actuating means is located in and adjustable along the path of linear movement of the cam follower.

20. In a power tool of a type having power operated rotary drive means, rotary output means for setting fasteners, an elongated housing, and a transmission received within the housing and including spring means coupling the drive means and output means, a torque indicating mechanism comprising a torque sensing device supported for linear movement longitudinally of the housing, the linear movement of the torque sensing device being proportional to deflection of the spring means upon relative rotation of the drive means and output means during a fastener setting operation, and an indicator operable responsive to linear movement of the torque sensing device for indicating torque applied by the spring means.

21. The torque indicating mechanism of claim 20 wherein the drive means and the output means are substantially aligned for rotation about a common axis and respectively include tubular portions in coaxial telescoped relation, and wherein the torque sensing device includes a slide drivingly connected to one of the tubular portions and supported on the other thereof for linear movement within the housing upon relative rotation of the drive means and output means.

22. The torque indicating mechanism of claim 21 wherein the indicator is received in a slot formed longitudinally of the housing in the path of linear movement of the slide.

23. In a power tool of a type having power operated rotary drive means, rotary output means for setting fasteners, an elongated housing, and a transmission received within the housing and including spring means coupling the drive means and output means, a torque indicating mechanism comprising a torque sensing device received for movement within the housing in operative alignment with an opening formed in the housing, and mounting means mounting the torque sensing device for movement in proportion to loading of the spring means upon relative rotation of the drive means and output means for providing an indication of the torque applied during a fastener setting operation.

24. The torque indicating device of claim 23 wherein the housing opening is provided by a slot extending longitudinally of the housing, wherein an indicator is received in the slot, and wherein the torque sensing device is supported by the mounting means for movement longitudinally of the housing, the torque sensing device being movable a linear distance proportional to loading of the spring means.

* * * * *